United States Patent Office 2,726,151
Patented Dec. 6, 1955

2,726,151

PRODUCING AND REACTIVATING A CARRIERLESS NICKEL CATALYST

Emil Kern, Dottikon, Switzerland, assignor to Schweiz. Sprengstoff-Fabrik A.-G., Dottikon, Switzerland No Drawing. Application June 10, 1950,
Serial No. 167,491

Claims priority, application Switzerland July 12, 1949

2 Claims. (Cl. 75—.5)

My present invention relates to a process for producing a highly active nickel catalyst which is particularly suited for producing amino compounds from nitro compounds.

Since Sabatier in 1897 succeeded in converting non-saturated organic compounds into saturated ones by conducting the same in the form of gas or vapor together with hydrogen through finely-divided metals, various processes have become known in the art for producing such catalysts.

Copper catalysts obtained by reducing black copper oxide at temperatures of 300–400° C., reduce only in the temperature range of 180–200° C. They further are sluggish and thus are of little interest for hydrogenation.

Nickel catalysts have been obtained by separating the nickel from solutions of nickel salts by adding a more electropositive metal. Again, oxide, hydroxide, nitrate, carbonate, formate, acetate, lactate, oxalate and tartrate as examples of salts of nickel have been precipitated on a suitable carrier such as pumice stone, diatomaceons earth, asbestos, coal and so on, and reduced in the dry state up to 16 hours in a hydrogen stream at temperatures between 200 and 450° C. The nickel catalysts thus obtained are, like Raney-nickel, highly pyrophorous, glow in the air and, thus, have to be used with great care.

I have found that pure nickelic hydroxide in aqueous suspension and without carrier medium may be reduced without any risk at all in an autoclave under hydrogen pressure and at temperatures above 80° C. to a highly active non-pyrophorous catalyst. The nickelic hydroxide may be precipitated from a nickel-salt solution by means of alkaline lye and after washing be reduced in the autoclave itself, without drying. The nickel hydroxide also may be produced from the extremely pure Mond-process nickel directly from the nitrate or sulfate, if care is taken to ensure that the nickel-ammonium complex salt produced when using nitric acid, is destroyed by lye. In this way, an extremely active nickel catalyst is obtained, which, when stirred, is finely distributed like foam. The said catalyst is non-pyrophorous and thus may be handled without any risk at all, and starts reduction at from 60 to 80° C.

Owing to the absence of a carrier, the said catalyst readily settles after reduction of the nitro compounds. Such property permits one to remove the reducing liquid overlying the catalyst bed from the autoclave, and to introduce a fresh batch of liquid nitro compound, or nitro compound dissolved in a solvent, into the autoclave after having removed the residual hydrogen pressure, without exposing the catalyst to air.

Owing to the relatively small catalyst volume, only slight traces of organic substance are retained by the catalyst. The latter, therefore, may be treated in the following manners:

1. Nickel catalysts chemically changed by the action of oxygen, acids, ammonia and so on, after thorough washing with a suitable solvent may be dissolved in diluted acid, converted into the hydroxide and reduced in aqueous suspension in the autoclave under hydrogen pressure.

2. Spent catalysts, after thorough washing with a suitable solvent in the autoclave at temperatures above 80° under hydrogen pressure, simply may be re-activated, using as liquid medium, e. g. water, acetone, alcohol, benzol, toluol and other solvents, with the exception of solvents which may themselves be reduced in this temperature range, such as nitro compounds.

For the reduction of one molecule nitro compound, approximately one gram of the new nickel catalyst is preferably used.

With the aid of the catalyst disclosed by my present invention, 10–12 reductions of 10 molecules of nitro compounds each have been carried out in succession and the catalyst did not lose strength. The following amino compounds have been produced with the same catalyst with a good yield and in good quality: aniline, ortho-, meta-, and para-toluidine, 3-amino-o-xylene, 4-amino-o-xylene, 2-amino-m-xylene, 4-amino-m-xylene, amino-p-xylene, ortho-anisidine, para-anisidine, para-phenetidine, ortho-aminophenol, para-aminophenol, alpha-naphthylamine, ortho-chloroaniline, para-chloroaniline, meta-phenylendiamine, and meta-toluylenediamine.

*Example 1.—Producing the nickel catalyst*

1140 g. $HNO_3$, 98% 6300 g. distilled water, and 400 gr. Mond-process nickel are heated for 5–6 hours at 100–110° C. in a rustless kettle having a lid and a hood, until all the nickel is dissolved. After cooling and filtering, there is obtained 5400 g. nickel solution of 7.39%=399 g. Ni. 5400 g. distilled water is added, heated to 95° C., and the hydroxide is precipitated at this temperature, while thoroughly stirring and slowly adding 6175 g. NaOH 10%. Stirring is continued at 95° C. until no more ammonia (resulting from the reduction of nitric acid by the nascent hydrogen formed when the nickel is dissolved in the nitric acid) escapes, whereupon the batch is cooled and centrifuged. The cake is washed with one liter water and dispersed in 25 l. water at 95° C., whereupon the suspension is cooled and centrifuged. Such washing is repeated once or twice until nitrate ions can no longer be detected.

For activation, the moist and nitrate-free nickel hydroxide is dispersed in 1200 cc. distilled water, brought into the autoclave, the air displaced by hydrogen, and the hydroxide treated with hydrogen, at a pressure of 40–60 atmospheres and a temperature of 150° C., during six hours while thoroughly stirring. The highly active nickel catalyst which in the moist state is very stable, is kept in water and away from the light.

*Example 2.—Re-activation of the spent catalyst*

When a catalyst through oxidation or chemical influences has become inactive, it is freed of adhering organic substances by thorough washing with a suitable solvent. The cleaned nickel metal then is dissolved, according to Example 1, in 15% nitric acid and the total diluted with its own volume of water. The nitrate solution then is heated to 95° C., and the nickel hydroxide precipitated at this temperature with 10% alkaline lye, washed free of nitrate, and reduced in the autoclave in hydrogen of 40–60 atmospheres pressure. The activation lasts approximately six hours.

*Example 3.—Re-activation of the spent catalyst*

When a catalyst has become inactive through exhaustion, i. e. through the loss of its entire hydrogen reserve, it is freed of adhering organic matter by means of a suitable solvent. Then 500 g. of solvent such as water, alcohol, acetone, benzene, toluene and the like is added and the suspension is activated during 2–4 hours in the autoclave at a hydrogen pressure of 40-60 atmospheres, and a temperature of 150° C.

The activation takes place at a substantially quicker rate in a thin medium, such as acetone for example than in water. It is to be noted, further, that Raney nickel when treated in accordance with the Example 2 or 3, loses its property of reducing at room temperature.

What I claim as new, is:

1. A method of preparing finely divided nickel for use as a hydrogenation catalyst which comprises dispersing particulate nickelic hydroxide in water, bringing the aqueous dispersion thus formed to a temperature of 80° to 150° C., and passing hydrogen at 40 to 60 atmospheres through the aqueous dispersion.

2. The method of claim 1 wherein the particulate nickelic hydroxide is obtained from spent catalyst reclaimed by nitric acid and converted into the hydroxide by sodium hydroxide.

References Cited in the file of this patent

UNITED STATES PATENTS

| 1,156,068 | Ellis | Oct. 12, 1915 |
| 1,548,872 | Ellis | Aug. 11, 1925 |

OTHER REFERENCES

"A Comprehensive Treatise on Inorganic and Theoretical Chemistry," by Mellor, vol. 15, published by Longmans, Green & Co., 1936, pages 33 and 41.

Hackh's "Chemical Dictionary," 3rd ed., published by Blakiston, 1944, page 283.